United States Patent [19]
Crowell et al.

[11] 3,762,262
[45] Oct. 2, 1973

[54] CONDUCTIVE CUTTING PAD

[75] Inventors: Douglas H. Crowell, Beverly;
Milton R. Radcliffe, Marblehead;
William Tabroff, Peabody, all of Mass.

[73] Assignee: U S M Corporation, Boston, Mass.

[22] Filed: Oct. 15, 1971

[21] Appl. No.: 189,506

[52] U.S. Cl. .................................. 83/658, 83/537
[51] Int. Cl. ............................................ B26d 7/20
[58] Field of Search ............... 83/658, 659, 533, 83/537; 260/87.7, 92.8 A

[56] References Cited
UNITED STATES PATENTS

| | | | |
|---|---|---|---|
| 3,626,800 | 12/1971 | Newton, Jr. et al. | 83/658 |
| 2,771,947 | 11/1956 | Cefaly | 83/658 X |
| 3,166,967 | 1/1965 | Garritt, Jr. | 83/658 |
| 3,227,024 | 1/1966 | Krebs | 83/658 X |
| 3,292,477 | 12/1966 | Raftery | 83/658 X |
| 3,343,437 | 9/1967 | Oster | 83/533 |

FOREIGN PATENTS OR APPLICATIONS 522,289   6/1940   Great Britain ......................... 83/658

Primary Examiner—Frank T. Yost
Attorney—Richard B. Megley et al.

[57] ABSTRACT

A conductive cutting pad of solid vinyl chloride polymer cast about and strongly adhered to a soft metal, cellular structure so that cell walls of the structure extend between cutting surfaces on the pad.

10 Claims, 5 Drawing Figures

PATENTED OCT 2 1973  3,762,262

*Inventors*
Douglas H. Crowell
Milton R. Radcliffe
William Tabroff
By their Attorney
Benjamin C. Pollard

CONDUCTIVE CUTTING PAD

The present invention relates to cutting pads and more specifically electrically conductive cutting pads for cutting presses.

Cutting presses are extensively used for cutting blanks or shaped pieces from sheet materials such as paper, leather, piece goods, etc., produced from various natural and synthetic materials. Simply described those presses constitute a cutting bed and a beam or platen mounted on a spindle, capable of movement over the cutting bed as well as to and away from the cutting bed in order to force a freely movable cutting die or dies through the sheet material or work located on the bed. The cutting bed carries, supports or includes a cutting pad, now generally rubber, which is compounded to be sufficiently rigid as to resist general deformation from pressure applied by the platen, and, at the same time be penetrable by the cutting dies to the extent that the dies can be forced through the sheet material and into the pad that short distance which serves to insure complete cutting or cutting through sheet material or work by the die or dies. The latter is a matter of compounding the rubber so that it retains a certain degree of flexibility and resilience.

A major difficulty met with cutting presses involves adjustment of the cutting stroke of the platen. The stroke should be sufficiently long to force the die completely through the sheet material but not so long as to have the dies penetrate the pad to the extent that they become stuck in the pad. Similarly and of more practical concern, repeated heavy striking of the pad by the die or dies caused by too long a stroke, leads to roughing and scoring of a cutting surface of the cutting pad. Cutting surfaces which are unduly roughed or scored lead to less complete cutting by the dies about the periphery of the blank or piece being cut from the sheet material. As a result more frequent dressing of the cutting surface is necessitated, with its attendant costs and inconveniences.

To overcome that difficulty and provide a convenient means by which to regulate stroke length, conductive cutting pads and cutting presses for utilizing those pads have been devised. One such press is described in U.S. Pat. No. 2,788,070. In that press an electrical control circuit carried through the platen, die and conductive cutting pad operates to move the platen away, back or up from the cutting pad when the die is forced into contact with the cutting pad.

Conductive cutting pads have been constructed in different forms. Actually two different types have generally been used. Each suffers shortcomings. The first is the composition type of pad made from a rubber composition which includes a relatively heavy loading of finely divided electrically conductive material which may be a metal but is usually carbon black. An example of such a pad is described in U.S. Pat. No. 2,912,388. One shortcoming of that type of pad is the necessity to compound it with a high degree of care so that the pad has the necessary strength and toughness in addition to having the conductive material, which, is as indicated used in large amount, uniformly dispersed or distributed throughout the finished pad. Another shortcoming of that type of pad is that it is impossible to prevent some cutting and dusting of the rubber-carbon black material at the cutting surface by the dies. That, due to the intense black color and coloring capacity of the material, can bring about staining or soiling of the work being cut, particularly where the work is light colored. The second type of conductive pad is what may be described as constituted of a multiplicity of planks, strips, etc., which are laminated together in alternating relationship, dielectric rubber and conductive soft metal. Examples of that type of pad are described in U.S. Pat. No. 3,167,990. In addition to staining possibilities, that type of pad also has shortcomings so far as achieving adhesion between the strips, sufficiently strong to withstand the heavy and repeated stresses of the cutting operation. Then too, because of the physical differences between aluminum and rubber wearing away of the cutting surface caused by repeated striking by the dies is generally uneven and in the form of ridges and hollows. Allowed to remain, that interferes with obtaining complete cutting and as a consequence frequent dressing of the cutting surface becomes a necessity. In that situation too, proper dressing is more difficult to obtain because of the laminate structure assembled from alternate planks of rubber and aluminum.

Accordingly, it is a principal object of the present invention to provide an improved conductive cutting pad.

It is another object to provide a conductive cutting pad exhibiting increased resistance to being cut, roughened, scored or ridged by cutting dies at its cutting surface.

It is another object to provide a conductive cutting pad exhibiting increased cutting life and requiring less frequent dressings during same while nevertheless retaining a cutting surface conductive to complete cutting of work by the cutting dies.

It is another object to provide a conductive cutting pad which causes less staining of work or sheet materials, and particularly those of light coloration cut on the same.

Those and other objects of this invention are obtained in an electrically conductive cutting pad defined by a pair of cutting surfaces. The subject pad constitutes a cast mass of solid vinyl chloride polymer composition and includes a metal structure or grid made up of interconnected wall members extending between the cutting surfaces and defining a multiplicity of cell structures filled with the vinyl chloride polymer composition and strongly bonded to the surfaces of the wall members.

The following drawings are included for the purpose of illustrating the invention in which.

Reference is now made to the drawings.

Figure 1:
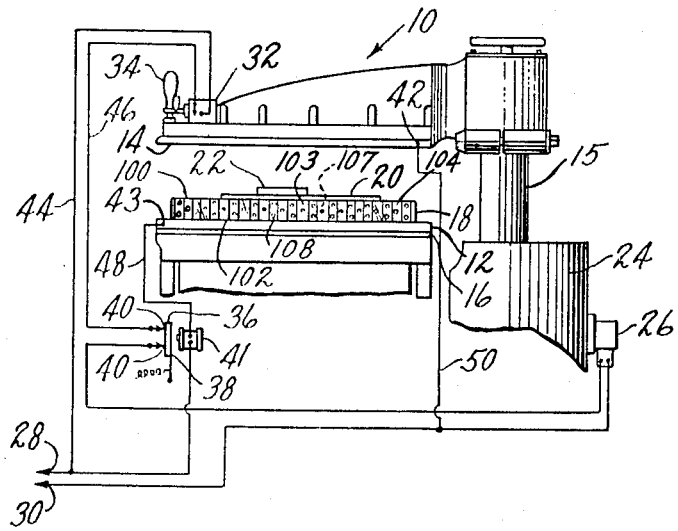
FIG. 1 is a partial, diagrammatic, side elevation of a cutting press carrying a conductive cutting pad and cutting die.

FIG. 1 illustrates, in somewhat diagrammatic manner, a cutting press 10, including an electrically conductive bed 12, a platen 14, and a dielectric insulating sheet 16. The platen 14 is carried on upright spindle 15. The conductive bed 12 is shown carrying a cutting pad 18 on which is located the work, sheet material 20 which is to be cut out to a shape defined by die 22 as registered on sheet 20. Cutting of sheet 20 by die 22 is effected by moving platen 14 toward the work by, for example, hydraulically operated means, not shown, housed within casing 24, which is controlled through electrically operated valve 26. The normal condition of valve 26 is such that platen 14 is up or back from the work 20. Valve 26 is connected into power lines 28 and 30 in series with a normally open switch 32 which is closed upon a downward push of spring-loaded handle 34. Also, in that circuit is switch means 36 including a spring-loaded armature 38 in contact with fixed contact points 40. A cooperating electromagnet 41 is connected into power lines 28 and 30 parallel with the switch 32 with terminals 42 on platen 14 and contact 43 on bed 12. When cutting die 22 is forced through work 20 and makes contact with cutting pad 18, the electromagnet 41 is activated causing armature 38 to move away from contact points 40 and open switch 36, which in turn operates valve 26 to cause platen 14 to raise or back away from work 20 to its normal rest position.

In operating the cutting press 10, a sheet 20 which is to be cut is placed on the cutting pad 18. Then, the die 22 or dies 22 are located on sheet 20. The operator pushes handle 34 downwardly to close switch 32, causing current to flow from the power line 28 through line 44, the closed switch 32, and then through line 46, closed switch 36, valve 26 to power line 30 to another terminal, not shown. Platen 14 comres down and presses die 22 downwardly into and through sheet 20, until it, die 22, makes contact with the conductive cutting pad 18. With that, the circuit is completed through pad 18. As a result, current flows from the power line 28, the electromagnet 41, connector 48, conductive cutting pad 18, die 22 and platen 14. From there it passes through connector 50 and power line 30 to the terminal, not shown. That serves to actuate electromagnet 41 causing switch 36 to open cutting off the power to valve 26, and raising platen 14.

Figure 2:
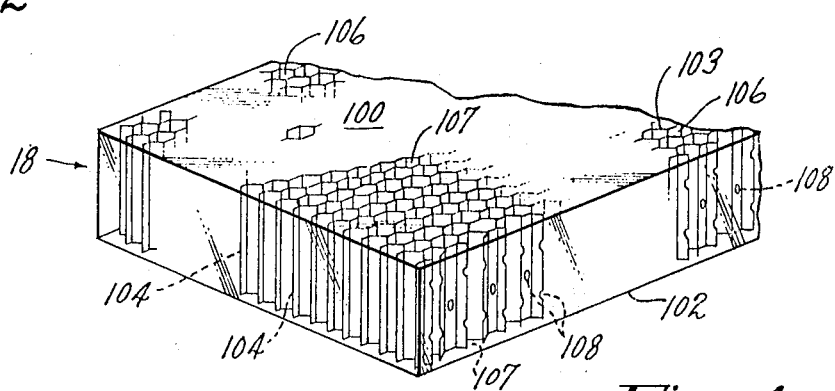
FIG. 2 is a partial, perspective view of one embodiment of the cutting pad of this invention.

A first embodiment of cutting pad 18 corresponding to that shown in FIG. 1 is shown with greater specificity in FIGS. 2 ad 3. The cutting pad 18 has a pair of cutting surfaces 100 and 102, only one of which is used in any given cutting operation. The cutting surfaces 100 and 102 which are essentially paralleled and opposite one another are interchangeable simply by inverting pad 18. The pad includes a cast mass of vinyl chloride polymer material including a soft metal structure 103, the latter shown in the form of a honeycomb structure, made up of a number of interconnecting walls 104. Walls 104 extend between the cutting surfaces 100 and 102. The interconnecting walls 104 are disposed with respect to one another so as to define a multitude or multiplicity of cells 106 filled with cast vinyl chloride polymer material 107. Walls 104 are shown provided with intercommunicating openings 108 allowing the vinyl chloride polymer mass in each of the individual cells 106 to be component parts of an overall continuous mass of vinyl chloride polymer making up or throughout pad 18. This preferred embodiment serves to contribute greater strength, dimensional stability as well as adhesive strength between the metal internal structure through its walls 104 and the vinyl chloride polymer 107 filling cells 106, and throughout the entire vinyl chloride polymer as a result. As a further result, the pad 18 shows additional extended life, in maintenance of good, even, cutting surfaces 100 and 102, with extended use. Also there is added resistance to wear, roughing, etc., by the dies 22 as well as more even or less irregular cutting away or roughing, gouging, etc., of those surfaces by dies 22. It is also preferred that the vinyl chloride polymer be cast to a clear or light color to further minimize staining of work, particularly light colored work. This is in addition to the improvement in nonstaining which is obtained from the utilization of cast vinyl chloride polymer in producing the conductive pad of the present invention.

Figure 4:
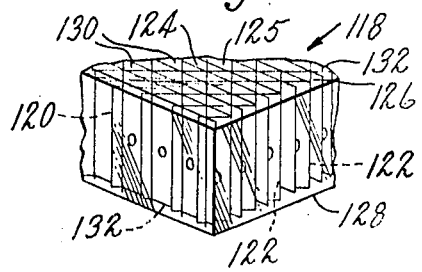
FIG. 4 is a partial perspective view of another embodiment of the cutting pad of this invention.

The embodiment shown in FIG. 4 is directed to a conductive cutting pad 118 in which the soft metal structure or grid 120 is constituted of connecting or interconnecting walls 122 as to form triangular shaped cells 124 which serve to include cast vinyl chloride polymer 125. This particular configuration of structure 120 is more resistant to deformation during pouring of the vinyl chloride polymer as a liquid thermosol, into a mold in which the structure is located, at the start of the casting operation. As a result, the individual walls 122 may be made of relatively thinner metal stock, and still maintain their given location and shape to provide cutting surfaces 126 and 128 with cell openings 130 of even distribution, that is the wall edges 132 retain their geometric shape, and the electrical conductivity of the pad remains distributed as predetermined.

Figure 3:
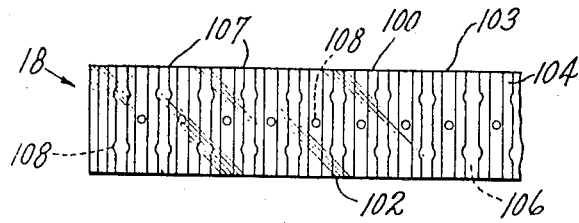
FIG. 3 is a partial, side elevation of the embodiment of the cutting pad corresponding to that shown in FIG. 2.
Figure 5:
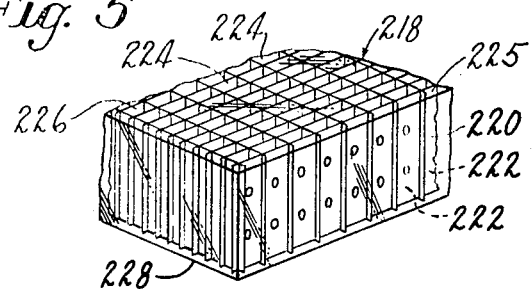
FIG. 5 is a partial perspective view of still another embodiment of the cutting pad of this invention.

The embodiment shown in FIG. 5 is directed to a conductive cutting pad 218 in which the soft metal structure or grid 220 preferably of aluminum, is constituted of connecting or interconnecting walls 222, as to form or define rectangular shaped cells 224 filled with cast vinyl chloride polymer 225 extending between cutting surfaces 226 and 228. This construction is intermediate in resistance to deformation by pouring of the vinyl chloride polymer as a liquid thermosol, between the embodiment shown in FIG. 4 and that shown in FIGS. 1-3. The subject embodiment has advantages from the standpoint of convenience or ease of production of the metal structure 220, as such. Other metal structures having wall disposition characteristics other than those shown are also intended for use in producing the conductive pads of the present invention, provided that the structure is made up of walls that are interconnected, extend between cutting surfaces of the pad, and define a multiplicity of cells which in the final pad product are filled with solid vinyl chloride polymer as a result of casting in a molding site.

The vinyl chloride polymer compositions for use in producing the conductive cutting pad of the present invention are initially liquid mixtures which may be conveniently cast to fill the cells 224 of the metal structure 220 and solidified by heating into solid state exhibiting relatively low shrinkage coefficients and a high degree of resistance to being cut by the cutting dies, that is, abrasion resistance. They should also have sufficient resilience as not to be chipped, cracked or broken by repeated impacts made by the dies. Vinyl chloride polymer compositions having hardnesses in Shore durometer D scale of 60 to 95 with a more preferred range of 70 to 85 are recommended.

Preferred vinyl chloride polymer compositions for casting to form the cutting pad of the present invention are those known as thermosols, that is fluid suspensions of fine particles of vinyl chloride polymer in a mixture of liquid plasticizer and liquid polymerizable monomer. The components of the thermosol are combined in proportions giving an initial viscosity allowing the composition completely and uniformly to fill the cells 224 of the metal structure or grid 220 and capable of being hardened by heating to cause the plasticizer to solvate and gel the vinyl chloride polymer particles, to fuse the gelled vinyl chloride polymer into a solid mass, and to polymerize the initially liquid monomer to resinous condition extending through the mass of vinyl chloride polymer to provide additional hardness and strength.

The vinyl chloride polymer used in the casting mixture is a high molecular weight resinous material. Homopolymers of vinyl chloride are ordinarily used, but for cutting surfaces for less demanding service, copolymers of vinyl chloride with smaller proportions of vinyl acetate maleic anhydride and other monomers may be used. To control viscosity of the thermosol, mixtures of very fine particle size vinyl chloride polymer resin, e.g., "dispersion grade" which may have a particle size of from about 1–3 microns will be used in combination with vinyl chloride polymer particles of somewhat coarser size, i.e., the so called "diluent" grade resins. Viscosity of the thermosol at the time of casting or molding should be below about 100,000 cps and preferably is about 60,000 cps. Combination of these resins to control viscosity follows practice in which the viscosity of the thermosol may be reduced by increasing the proportion of so called diluent or larger particle size resin. For the present cutting pad composition, roughly equal parts of the dispersion grade and diluent grade resins are used; but the proportions may vary from 70:30 to 30:70.

The plasticizer components useful in the thermosol include conventional plasticizers such as di-isodecyl phthalate, di-ethylhexyl hexahydrophthalate, tricresyl phosphate and di-ethylhexyl adipate. Along with these plasticizers it is often desirable to include epoxidized plasticizer materials such as, for example, epoxidized soy bean oil or octyl epoxy tallate which contribute heat and light stability as well as plasticizing action to the composition.

Improved adhesion between the vinyl chloride polymer composition and the metal walls 104 of the metal grid 103 and an apparent increase in toughness of the cutting pad are secured where a portion of the plasticizer is one of the known adhesion-promoting plasticizers, for example, the plasticizer compositions containing mono- and di-methacrylate esters shown in U.S. Pat. No. 3,390,115. Substantial improvement in strength of union between the resin and the metal grid is obtained where ten parts by weight of the adhesive-promoting plasticizer is used based on 100 parts by weight of the vinyl chloride polymer resin and amounts as high as 20 or more parts by weight based on 100 parts by weight of the vinyl chloride polymer resin may be used. Improved adhesion between the vinyl chloride polymer and the metal grid may also be obtained by including a liquid epoxy material such as, for example, the commercially available cycloaliphatic epoxy known as ERL 4206 available from the Union Carbide Company. Ordinarily, from about three parts to about 10 parts by weight based on 100 parts by weight of the vinyl chloride polymer resin will be used.

A variety of liquid monomeric materials may be used in the thermosol and polymerization for the heating of the composition; but it is preferred to use a trifunctional monomer, for example, trimethylol propane trimethacrylate. That is, polymerization of the trifunctional material gives a three dimensional cross-linked polymer providing additional toughness and dimensional stability as well as superior resistance to heat and solvent. However, other polymerizable monomers such as tetraethylene glycol dimethacrylate, ethylene glycol dimethacrylate, diethylene glycol diacrylate and trimethylol propane triacrylate may be used. About 10 parts by weight of polymerizable monomer based on 100 parts by weight of the vinyl chloride polymer has been found important to give desired hardness and resistace to heat and solvents and as much as about 20 parts may be used. Higher proportions have been found to give excessive shrinkage and cracking of the molded cutting pad. Also, it has been found that best results are secured where the sum of the weights of adhesion-promoting plasticizer and polymerizable monomer is from 20 to 30 parts by weight for 100 parts by weight of vinyl chloride polymer.

To effect polymerization of the monomer during the heating step, free radical forming catalysts, usually peroxy materials are ordinarily used. Useful catalysts include t-butyl perbenzoate, benzoyl peroxide, cumen hydroperoxide, and dicumyl peroxide.

Vinyl chloride polymer compositions having a hardness within the desired range of 60–95 on the Shore durometer D scale may be obtained by combining the above materials in relative proportions based on 100 parts by weight of the vinyl chloride polymer of from about 30 to about 45 parts by weight of total plasticizer including adhesive-promoting plasticizer and from about 10 to about 20 parts by weight of the liquid monomer. Various additives may also be included in the mass such as surfactants, anti-oxidants, stabilizers, and fillers, preferably white or light colored.

The metal cellular structure which is included as the electrically conductive member in the cutting pad may be produced from a number of relatively soft metals or metal alloys. These may include aluminum, which is preferred, as well as titanium; tin and ferrous alloys, silver, zinc, etc. The thickness of the structure walls as well as sizes of the cell openings formed by or between the walls, that is the distances from wall to wall, may be varied based on the conductivity of the particular metal or alloy chosen. When an aluminum structure having a wall thickness of 0.005 inch is used to produce a cutting pad 1.0 inch in thickness the cells may range between 0.125 to 2.00 inch in opening, or diameter.

In order to facilitate adhesion between the cast vinyl chloride polymer and the metal structure it may be desirable to use a primer or coupling agent, which is applied to the metal structure as a preliminary to the casting operation. Organo-functional silane compositions work well in this regard. The amount of silane required is very small, so that dipping, spraying or other convenient application procedure may be practiced. Silanes which may be used to advantage include amyltriethoxy silane, ethyltriethoxy silane, phenyltrichloro silane, vinyltriacetoxy silane, etc.

A mold for forming the cutting pad is preferably made of a conductive metal such as aluminum to enable uniform application of heat to effect curing of the thermosol composition. The dimensions of the mold should be very slightly larger than the desired finished size to allow for shrinkage which approximates one percent. A suitable mold may be constructed of ½ inch thick aluminum sheet with a cover mounted so that the cover can be pressed against the material in the mold during curing. Desirably, a number of small holes may be provided in the cover to allow escape of air and to permit excess material to be squeezed out of the mold.

Prior to the casting operation the mold is sprayed with a conventional mold release. Thereafter, the components of the thermosol are mixed uniformly together using conventional mixing means and procedure. The mixture is poured into the mold and the expanded and primed aluminum cellular structure is then dropped into the mold. The cover is put on the mold and the filled mold is put in a press having heated platens for curing. Only enough pressure is applied to the mold cover to assure intimate contact between the platen and the mold surfaces and to squeeze excess material out of the mold. It has been found desirable to release pressure from the mold for a short period early during the heating schedule, for example, 3 to 5 minutes to allow remaining trapped air to escape.

The heating conditions used will depend on the plasticizer and catalyst used, the polymerization material selected, and on the particle size of the vinyl chloride polymer material used. In general, curing is accomplished in less than an hour, usually ½ to ¾ hour, using temperatures of from 320° to 360° F.

On completion of the heating and pressing, the mold is removed from the press and after being allowed to set for a short period, for example, 5 minutes, the cover is preferably removed since at this time the screws pull out more easily from the holes in the mold cover. When cooled to room temperature, the pad is easily taken from the mold.

After removal from the mold the pad is dressed to provide it with even, preferably substantially parallel cutting surfaces.

The following examples are included to aid in understanding the invention; but it is to be understood that the invention is not restricted to the particular materials, temperatures, properties and other details given in the examples.

Example I

A thermosol was prepared having the following formula:

| Components | Parts by Weight |
|---|---|
| Polyvinyl Chloride Dispersion Grade (high molecular weight very fine particle size material) | 50 parts |
| Polyvinyl Chloride "Diluent Grade" (high molecular weight finely divided powder) | 50 parts |
| Diisodecylphthalate | 10 parts |
| Octyl Epoxy Tallate | 10 parts |
| "Adhesive Plasticizer PA 5" (Eastman) | 10 parts |
| Trimethylol Propane Trimethacrylate | 15 parts |
| t-butylperbenzoate | 0.08 parts |
| Ba-Cd Commercial Polyvinyl Chloride Stabilizer | 3 parts |
| Tin Stabilizer | 3 parts |
| Surfactant | 1 part |

The above materials were uniformly mixed together in a "pony" mixer.

3/16 inch diameter holes were formed in an unexpanded aluminum honeycomb and the honeycomb was then expanded to form ¾ inch hexagonally cells, the honeycomb being 1 inch high. The honeycomb was cleaned by vapor degreasing and dipped in silane solution and air dried.

The honeycomb was disposed in a mold supported on lower platen of a press and the thermosol was poured in to fill the cells. Thereafter, the cover of the mold which was provided with 3/32 inch holes disposed over its entire surface was placed on the mold. The platens of the mold which were maintained at a temperature at 350° ± 5° F. were then moved to supply only sufficient pressure to insure intimate contact between the platens and the mold surfaces and to squeeze excess mold material from the mold. The mold was left in the press for about 45 minutes and then removed. 5 minutes after removal of the mold from the press the cover of the mold was taken off and the pad was allowed to cool. On cooling, the molded pad separated readily from the mold, one surface of the demolded pad was placed and adhesively bonded to a wooden backer block using a conventional epoxy base adhesive, the pad and backer block being clamped firmly together until the epoxy adhesive was fully cured. The free-surface of the block was then dressed to provide an even cutting surface. The molded polyvinyl chloride had a hardness of 67 on the D Scale as determined on the Shore Durometer.

The pad was given an extended trial in which all types of material from nylon cloth to shoe upper material were cut on it. The pad's cutting qualities were excellent and after 2½ months' trial, the pad still was not worn enough to require resurfacing.

Example II

| Components | Parts by Weight |
|---|---|
| Polyvinyl Chloride "Dispersion Grade" (high molecular weight very fine particle size material) | 45 parts |
| Polyvinyl Chloride "Diluent Grade" (high molecular weight finely divided powder) | 45 parts |
| Copolymer of Vinyl Chloride, Vinyl Acetate, and Maleic Anhydride 90–8–2 fine powder | 10 parts |
| Diisodecylphthalate | 30 parts |
| Trimethylol Propane Trimethacrylate | 15 parts |
| Dicumyl Peroxide | 0.15 parts |
| Cycloaliphatic Epoxy (ERL 4206 Bakelite Company) | 5 parts |
| Stabilizer | 3 parts |

The composition was mixed, molded, bonded to a wooden backer and dressed following the procedure of Example I.

The resulting cutting pad had excellent properties but was somewhat less wear resistant than the pad of Example I.

Having thus described our invention what we claim is new and desire to secure by Letters Patent of the United States is:

1. An electrically conductive cutting pad exhibiting increased cutting life and resistance to staining of work cut on the said pad and providing uniform distribution of electrical conductivity over the cutting surface said pad comprising a cast mass of fused and cured light-colored solid vinyl chloride polymer composition having a Shore durometer hardness in the range of 60–95 on the D Scale providing a pair of opposing cutting surfaces, and a honeycomb structure of relatively soft metal comprising interconnecting wall members extending between said cutting surfaces, the wall members forming a multiplicity of evenly distributed cell structures of substantially uniform, repeating, geometrical shape open to said surfaces and filled with said vinyl chloride polymer composition, the vinyl chloride polymer composition within the cells defined by said wall members being strongly bonded to the surfaces of said wall members.

2. An electrically conductive cutting pad as defined in claim 1 in which said vinyl chloride polymer composition includes a major portion of vinyl chloride polymer, an ester-type plasticizer and an in situ cross-linked polymer in intimate reinforcing, dimension stabilizing relation throughout the mass of polyvinyl chloride polymer.

3. An electrically conductive cutting pad as defined in claim 2 in which said vinyl chloride polymer composition includes 100 parts by weight of vinyl chloride polymer, from about 10 to about 20 parts of said cross linked polymer, from about 10 to about 30 parts of said ester-type plasticizer and from about 10 to about 30 parts by weight of an adhesive plasticizer, the combined weights of said ester-type plasticizer and said adhesive plasticizer being from about 35 to about 45 parts by weight and the sum of the weights of cross linked polymer and of said adhesive plasticizer being from about 20 to 30 parts by weight.

4. An electrically conductive cutting pad as defined in claim 3 in which said cross linked polymer is the product of polymerizing in intimate admixture with said vinyl chloride polymer at least one member of the group consisting of dimethacrylate, trimethacrylate, diacrylate and triacrylate esters of short-chain glycols and polyglycols.

5. An electrically conductive cutting pad as defined in claim 3 in which said cross-linked polymer is the product of polymerizing in intimate admixture with said vinyl chloride polymer at least one ester from the group consisting of mono- and dimethacrylate esters of 2,2,4 - trimethyl 1,3 pentanediol and 2,2-dimethyl 1,3 - propane diol.

6. An electrically conductive cutting pad as defined in claim 5 in which a reactive organo-functional silane primer is disposed between the surfaces of said wall members and the vinyl chloride polymer composition within the cells defined by said wall members.

7. An electrically conductive cutting pad as defined in claim 1 in which said vinyl chloride polymer composition is an intimate mixture of polyvinyl chloride, a copolymer of vinyl chloride with a small proportion of maleic anhydride, a cross linked polymer in intimate reinforcing, dimension stabilizing relation throughout the mass of vinyl chloride polymer, a plasticizer and a compound including at least two reactive epoxide groups.

8. An electrically conductive cutting pad as defined in claim 7 in which said vinyl chloride polymer includes from about 85 to 95 parts by weight of polyvinyl chloride, from about 5 to about 15 parts of said copolymer of vinyl chloride, from about 15 parts to about 30 parts by weight of said cross-linked polymer and from about 3 parts to about 10 parts by weight of said compound having reactive epoxide groups.

9. An electrically conductive cutting pad as defined in claim 8 in which said cross-linked polymer is a member of dimethacrylate, trimethacrylate, diacrylate and triacrylate esters of short-chain glycols and polyglycols and in which said compound having a reactive epoxide group is a member of the group consisting of cycloaliphatic diepoxides and Bisphenol-A diepoxides.

10. An electrically conductive cutting pad as defined in claim 9 in which a reactive organo-functional silane primer is disposed between the surfaces of said wall members and the vinyl chloride polymer composition within the cells defined by said wall members.

* * * * *